United States Patent [19]

Yu

[11] Patent Number: 4,787,421

[45] Date of Patent: Nov. 29, 1988

[54] FLOW PATH DEFINING MEANS AND METHOD OF MAKING

[75] Inventor: Mason K. Yu, Birmingham, Mich.

[73] Assignee: General Motors Corporation, Detroit, Mich.

[21] Appl. No.: 63,796

[22] Filed: Jun. 22, 1987

Related U.S. Application Data

[63] Continuation of Ser. No. 851,973, Apr. 14, 1986, abandoned.

[51] Int. Cl.⁴ ............................................... F16L 9/00
[52] U.S. Cl. .................................................... 138/178
[58] Field of Search ................................ 364/509–512, 364/188; 138/178, 177; 415/210, 211

[56] References Cited

U.S. PATENT DOCUMENTS

| | | | |
|---|---|---|---|
| 3,860,360 | 1/1975 | Yu. | |
| 3,860,803 | 1/1975 | Levine | 364/512 |
| 3,865,998 | 2/1975 | Weiss et al. | 381/68.6 |
| 3,927,948 | 12/1975 | Cox | 364/512 |
| 4,606,524 | 8/1986 | Conee | 354/293 |
| 4,642,585 | 2/1987 | Saad | 333/21 R |

OTHER PUBLICATIONS

NASA Tech Brief, 68-10395, Oct., 1968, Design of Fluid-Duct Bends with Low Pressure Loss, Clearinghouse for Federal Scientific and Technical Information, Springfield, Va. 22151.

Primary Examiner—Henry J. Recla
Attorney, Agent, or Firm—Robert J. Outland

[57] ABSTRACT

Flow path defining means such as curved conduits, ducts, spillways, engine manifolds and ports, vehicle bodies, missiles and other means defining interior or exterior flow paths for fluids may be designed and generated through the use of a modified super-elliptical equation applied to cross sections between the ends to establish the coordinates of the boundary surface of the flow path. An optional coordinate transformation system and other features are also disclosed.

12 Claims, 14 Drawing Sheets

P1 = 2.000
Q1 = 2.000
AB1 = 1.500
A1 = 0.818
B1 = 0.545

P2 = 3.000
Q2 = 3.000
AB2 = 3.936
A2 = 0.818
B2 = 0.208

LEFT SECTION

P2 = 1.100
Q2 = 3.000
AB2 = 0.670
A2 = 0.256
B2 = 0.383

RIGHT SECTION

P1 = 2.000
Q1 = 0.800
AB1 = 1.913
A1 = 0.732
B1 = 0.383

FLOW PATH DEFINING MEANS AND METHOD OF MAKING

CROSS REFERENCE

This is a continuation of abandoned patent application Ser. No. 851,973 filed Apr. 14, 1986.

FIELD

This invention relates to flow path defining means such as curved conduits, ducts, spillways, engine manifolds, intake and exhaust ports and the like as well as vehicle bodies, missiles and similar objects which define either interior or exterior curving boundaries of flow paths for fluids. The invention further relates to method for configuring and making such flow path defining means.

BACKGROUND

It is known in the arts pertaining to fluid flow in enclosed flow paths and around solid bodies that significant flow efficiencies can be obtained by he proper configuration of curving wall portions to conserve flow energy and avoid unnecessary sudden changes in pressure and flow direction. For example, it has long been recognized in regard to complex internal flow passages, such as piston engine ports and manifolds, the vaneless scroll collectors of radial flow turbomachinery and jet engine ducting, that continuous and smooth flow-area distributions and gradual boundary transistions between adjacent sections must be provided in order to minimize total pressure losses.

It has also been shown in my prior U.S. Pat. No. 3,860,360, granted Jan. 14, 1975 to the assignee of the present invention, that a super-elliptical equation may be utilized to define the boundaries of a diffuser duct for a centrifugal compressor having a flow path changing from rectangular to elliptical cross section over its length. However, the prior disclosure does not indicate any suitable manner of defining complex curved flow paths or straight paths of smooth and continuously varying cross-sectional shape and configuration except for the particular embodiment disclosed in my prior patent.

INVENTION SUMMARY

The present invention comprises a method for generating wire frame type representations of flow bodies having smooth streamlined surfaces which may be continuously varied in area and shape. The flow bodies may comprise means defining internal passages such as intake and exhaust conduits, manifolds and ports or external flow path defining means such as vehicle bodies, for example. The method is versatile, simple and easy to use for specifying efficient curved fluid flow passages and bodies with independent control of the shape and area along the flow paths. The method also allows simple implementation of changes to a design if modifications are desired after a first trial design.

These and other features and advantages of the invention will be more fully understood from the following detailed description of the invention and its various characteristics, including the steps of the method by which it is practiced and examples of types of flow bodies which can by formed thereby, all taken together with the accompanying drawings.

DRAWINGS

Figure 10:
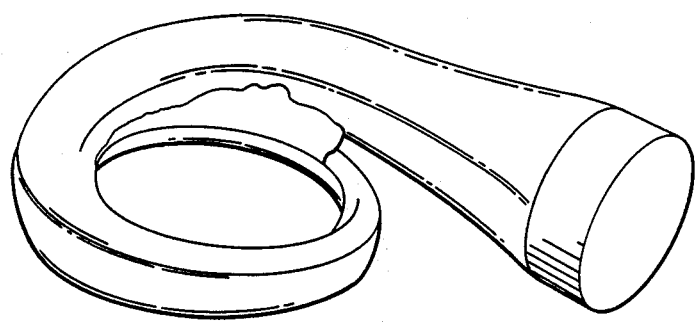
Figure 11:
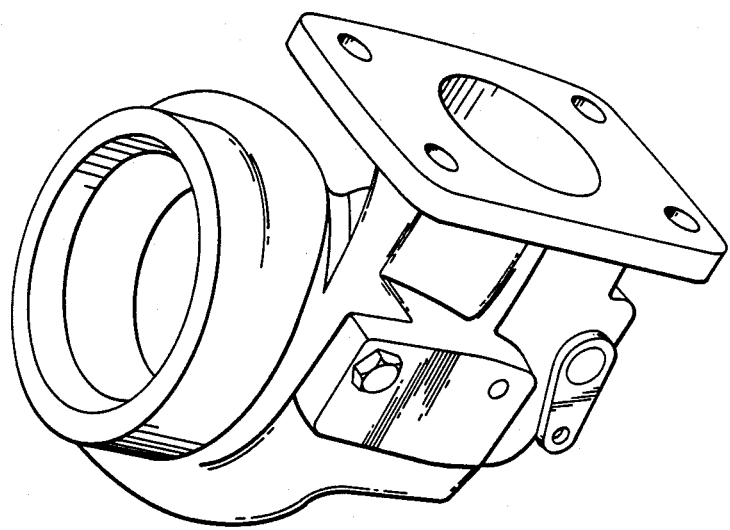
Figure 12:
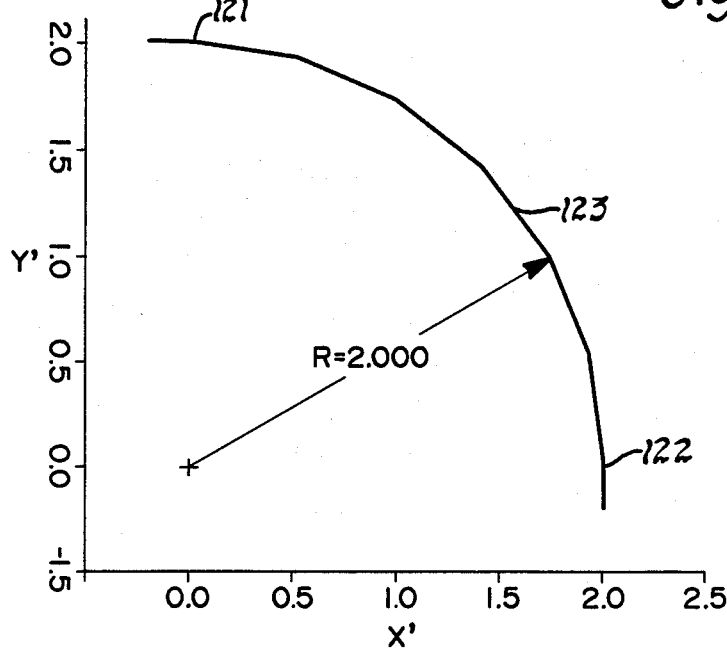
Figure 13:
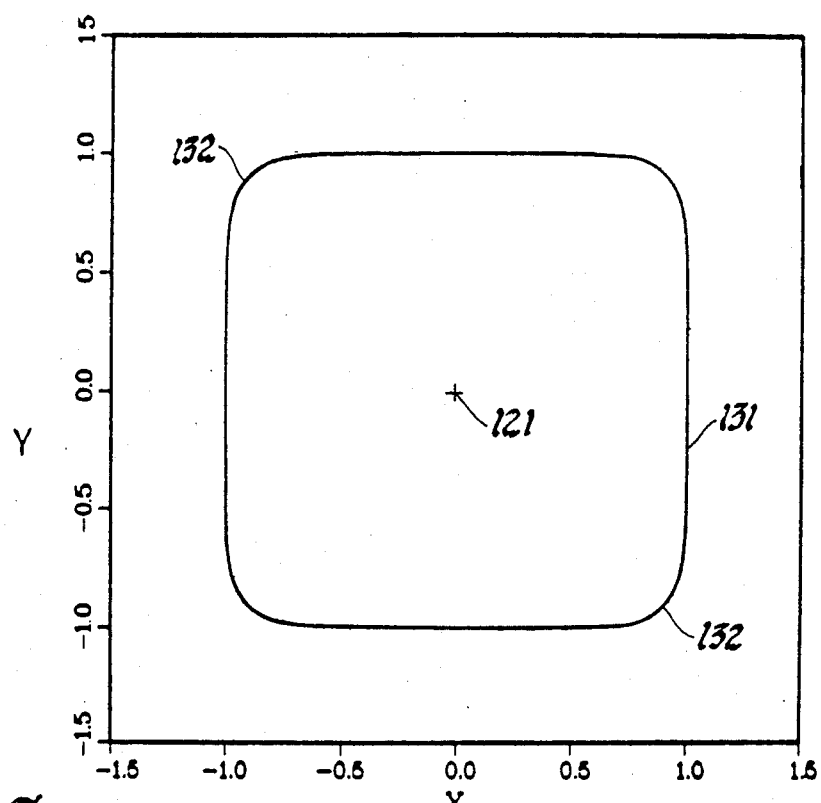
Figure 14:
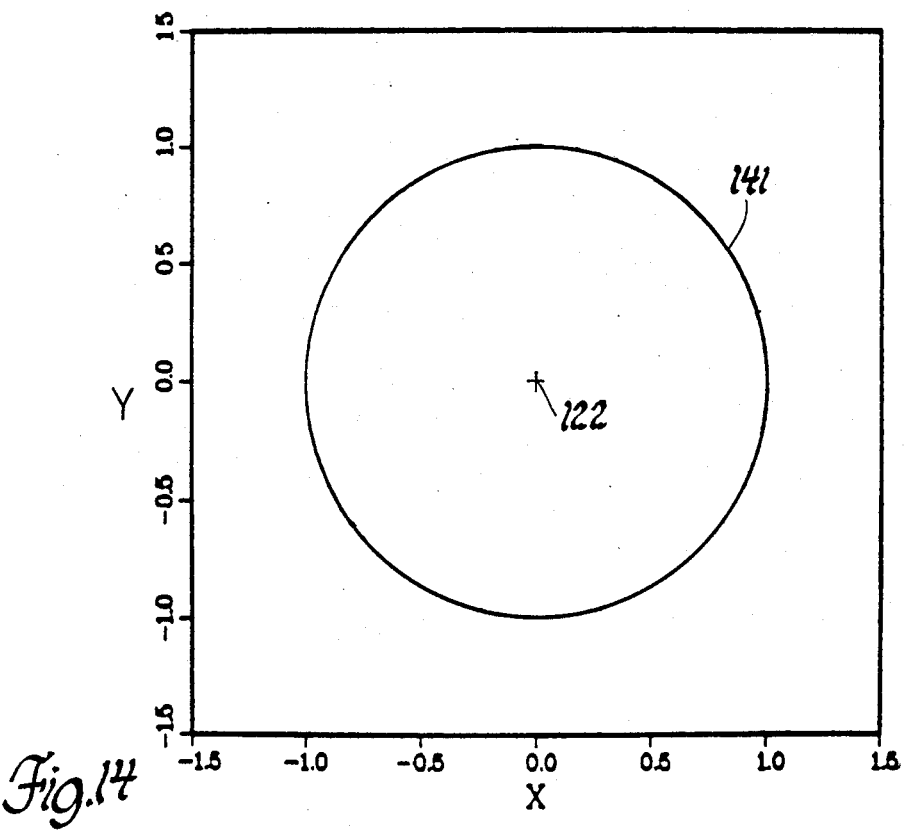
Figure 15:
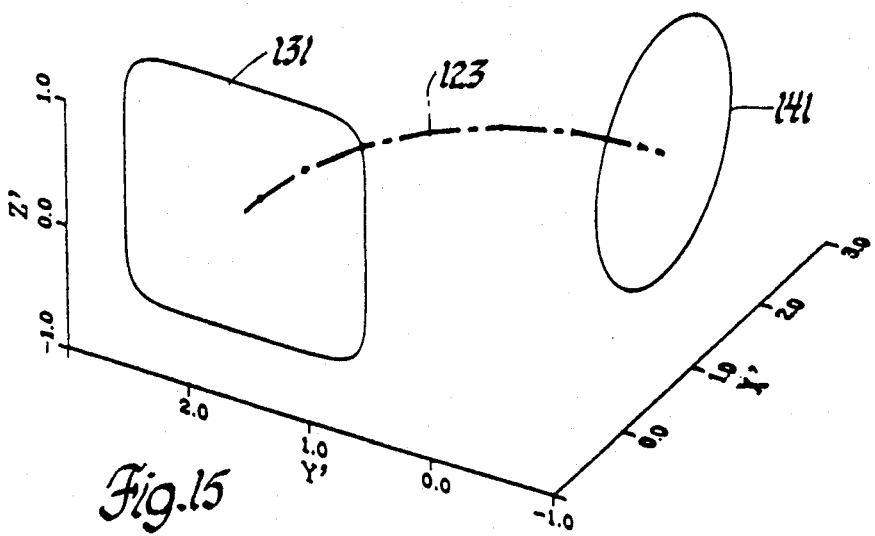
Figure 16:
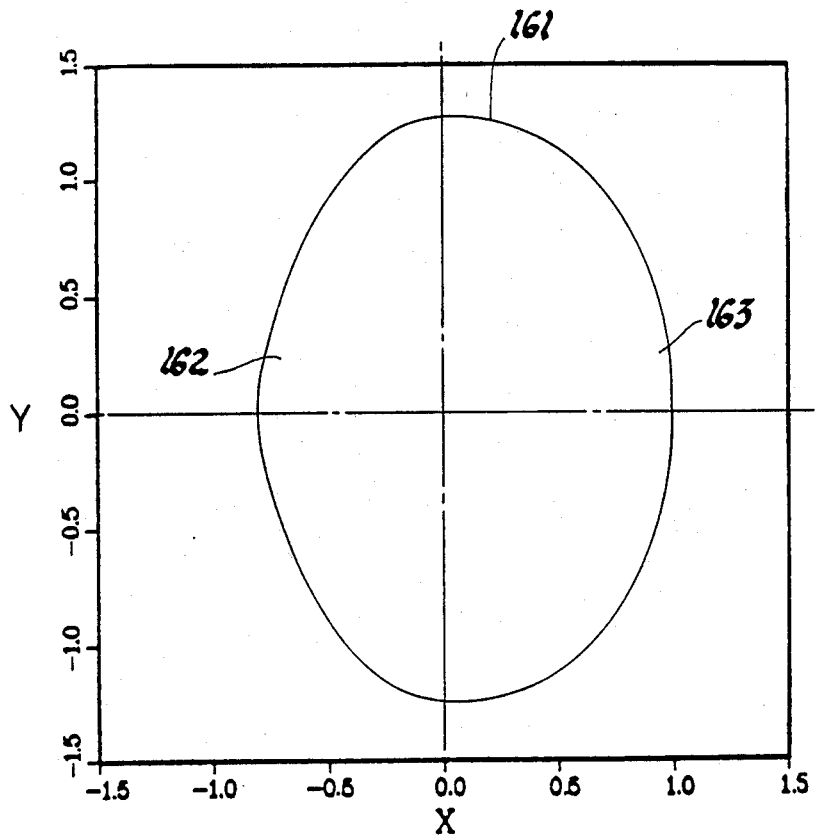
Figure 17:
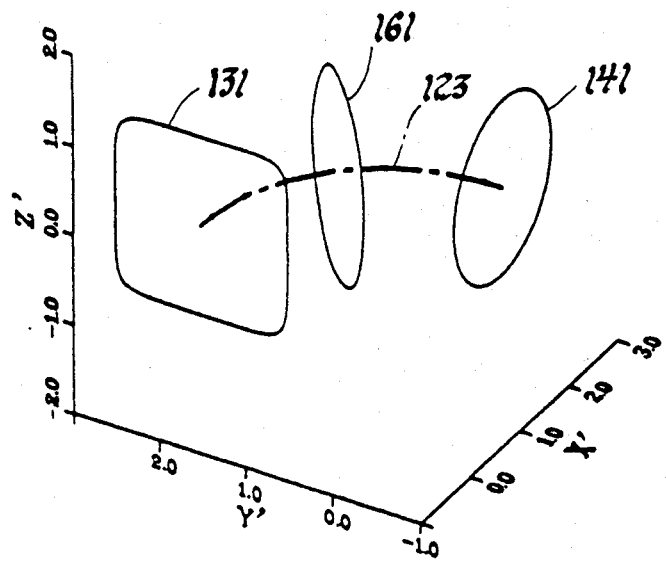
Figure 18:
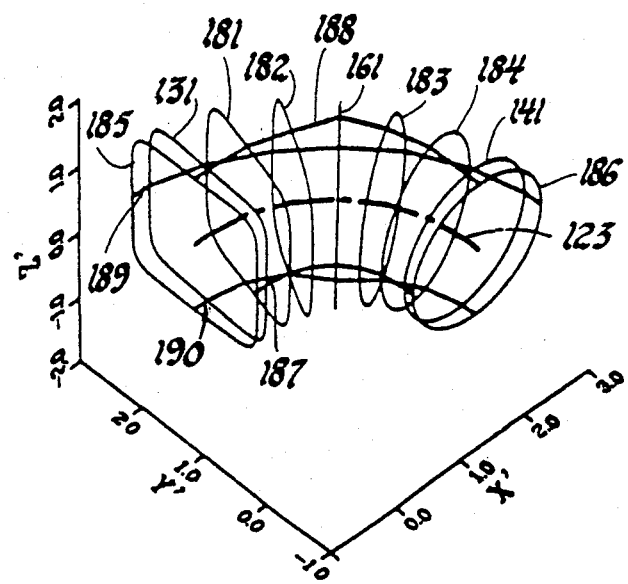

FIGS. 7a–d show front, top, side and pictorial views of a wire frame configuration for a manifold passage;

FIGS. 8a–d show top, side, front and pictorial views of a wire frame configuration for a vehicle body;

FIGS. 9a–d show front, top, side and pictorial views of a wire frame configuration for a turbine scroll;

FIG. 10 is a pictorial view of a finished core assembly having the configuration of FIG. 9;

FIG. 11 is a pictorial view of a turbine scroll casting with a core cavity in the shape of the core assembly of FIG. 10;

FIG. 12 is a graphical illustration of the centerline of an exemplary 90° elbow;

FIG. 13 is a face view of the inlet cross section of the elbow;

FIG. 14 is a face view of the outlet cross section of the elbow;

FIG. 15 is a perspective view of the initial layout of the elbow inlet and outlet;

FIG. 16 is a face view of the center cross section of the elbow;

FIG. 17 is a perspective view of the intermediate layout including the central cross section of the elbow; and FIG. 18 is a perspective view of a nearly complete layout of the elbow including intermediate cross sections.

DESCRIPTION

The broadly defined steps of the method of the present invention, when applied in accordance with its principles, are useful in designing and making efficient curved path flow bodies of many types and cross-sectional configurations, some examples of which are subsequently discussed. The invention resulted from my recognition over a long period of study and development, that that the super-elliptical equation of my prior U.S. Pat. No. 3,860,360 could be further modified to be useful in the design and production of many more variations of curved flow path bodies. Development of an optional coordinate transformation method further increased the possible variations of which my method is capable.

In its broader aspects, the method comprises the steps of:

1. Defining a desired mean line, or reference line, for the flow body between spaced locations.
2. Using a modified super-elliptical equation to define the cross-sectional shape and area normal to the mean line of the flow body at an arbitrary number of locations along its length.
3. Optionally applying a coordinate transformation method to vary the cross-sectional shapes previously determined without changing their areas. This step can be utilized to adjust the shape of a developed body to meet exterior space constraints.
4. Forming a flow body having a boundary surface conforming to the dimensions of the calculated series of cross-sectional shapes at corresponding locations along its length.

These steps and the particulars of the method are amenable to implementation by means of a computer program and it is expected that the method will be so applied.

In a specific application of the foregoing steps, it is necessary to apply the generally known principles applicable to the body or passage defining means under consideration in order to develop an appropriate design. The method of the present invention comes into play in developing a smooth and streamlined flow surface having closely controlled changes in shape and cross-sectional area which minimize the flow losses attributable thereto. This is accomplished primarily by avoiding any abrupt changes in either the area or the boundary surface. However such changes can be accomodated if necessary.

Thus, in carrying out the first step of the method, it is desirable to establish a mean line which minimizes the number of curves and the degree of curvature in the flow path to be defined. Naturally, this choice is limited by the requirements of the particular port, passage or body being developed. The initial form of the flow path may then be developed for most efficient flow by applying the super-elliptical function or equation discussed below in accordance with step two.

MODIFIED SUPER-ELLIPTICAL FUNCTION

The modified super-elliptical equation or function which I have developed for use in this invention is defined as $$|x/a| + |y/b| = 1 \quad (1)$$

where
$-a \leq x \leq a$
$-b \leq y \leq b$
and p and q are arbitrary exponents where
$0 \leq p < \infty$
$0 \leq q < \infty$ "a" and "b" determine the size and "p" and "q" determine the shape of the super-ellipse.

Figure 1:
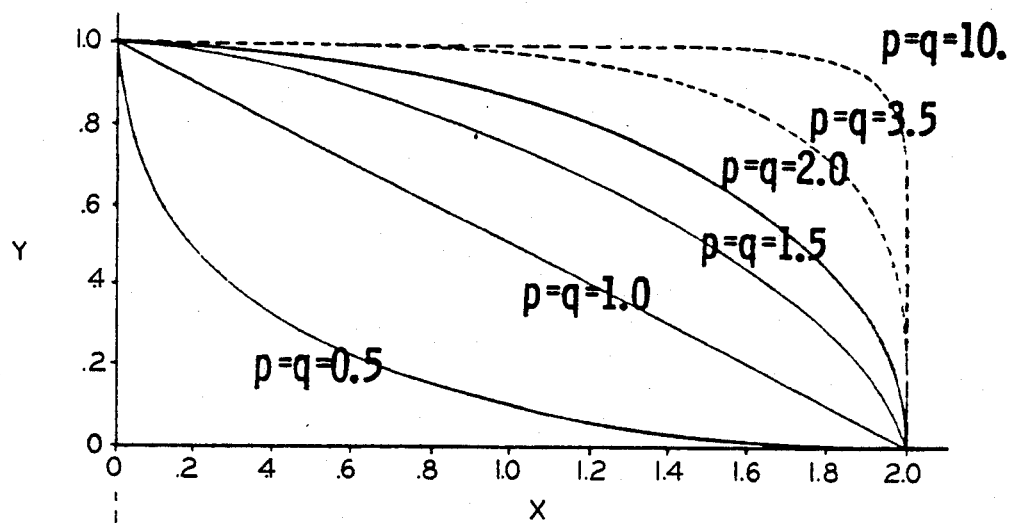
FIG. 1 is a graphical illustration of the effects of the p and q exponents on the shape determined by the modified super-elliptical equation.
Figure 1:
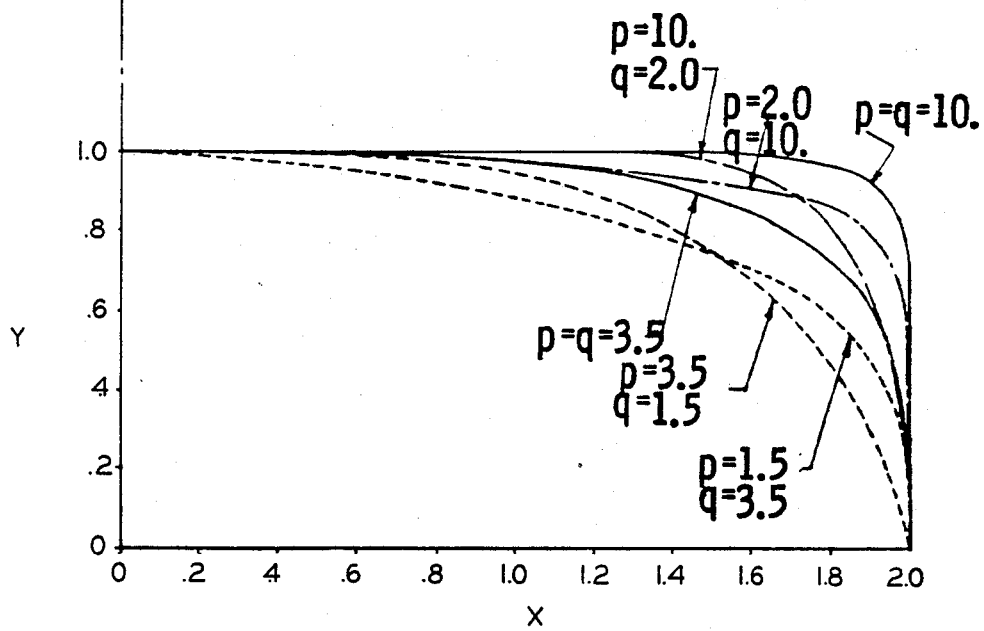

The significance of exponents p and q can be described as follows: when p=q, the higher their value, the closer the cross section shape approaches a rectangle; at values of 1 a diamond is formed and at lower values, the cross section approaches a cross; when p>q, one side of the figure will approach the line y=b more closely than the other side approaches the line x=a; when p<q, the reverse holds. The shapes and trends can be seen in FIG. 1.

Figure 2:
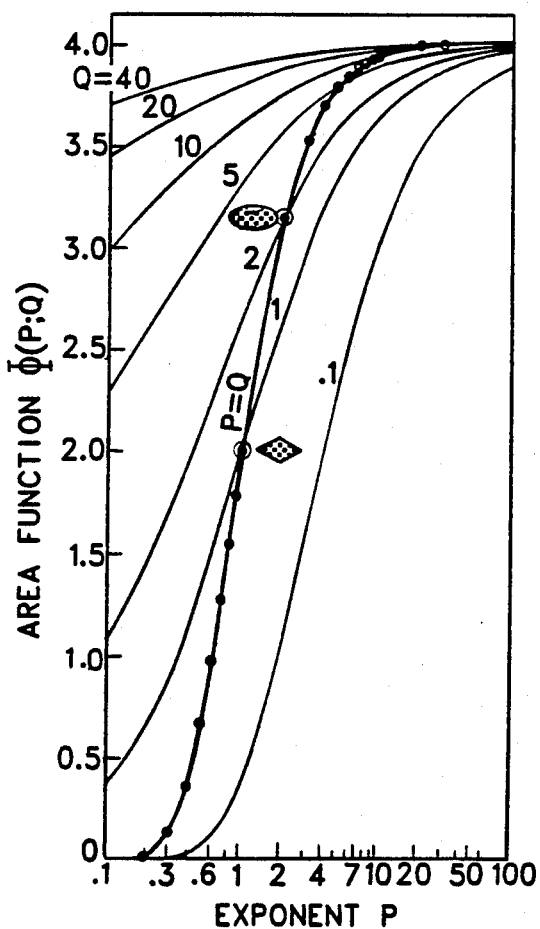
FIG. 2 is a graph of the area function $\phi(p,q)$ at various values of the exponents p and q.

The area enclosed by the modified super-elliptical function is calculated as $$\text{Area} = ab \, \phi(p, q) \quad (2)$$

where $\phi(p, q)$ is a function of the exponents p and q only. The values of $\phi$ for various values of p and q are shown in FIG. 2 and are computed by evaluating the expression.

$$\phi(p,q) = 4 \frac{\Gamma(1/p)\Gamma(1/q)}{\Gamma(1/p + 1/q)} \quad (2.1)$$

where $\Gamma$ designates the usual mathematical Gamma function.

The formulation of equation (2) highlights an important feature of this method. The shape of the cross section is determined by the exponents p and q and the area of the cross section is determined by the values of a and b. This separation of the area and shape parameters, making them independent of one another, is very significant, as it allows specification of the flow path area and subsequent manipulation of the shape, rather than having to deal with the shape and area simultaneously.

The usual way to apply equation (2) is to specify two of the three parameters Area, a and b, and then solve for the third one. Since equation (2) provides a direct solution, there is no iteration involved and the procedure is very fast. Alternatively, one could specify the ratio of a/b instead of either a or b.

SPLIT FIGURES

A cross section may also be defined by a different super-elliptical function in each half-plane or each quarter-plane. If, for example, the plane is split into halves along the x-axis, the resulting cross section will be symmetric with respect to the y-axis, and vice versa.

Figure 3A:
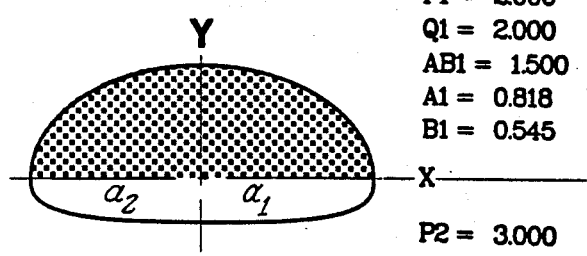
FIG. 3a is a cross section split figure formed by the invention with y-axis symmetry and the given characteristics.

For the case of y-axis symmetry then, referring to FIG. 3a and the associated nomenclature $$a_1 = a_2 \quad (3)$$

Figure 3B:
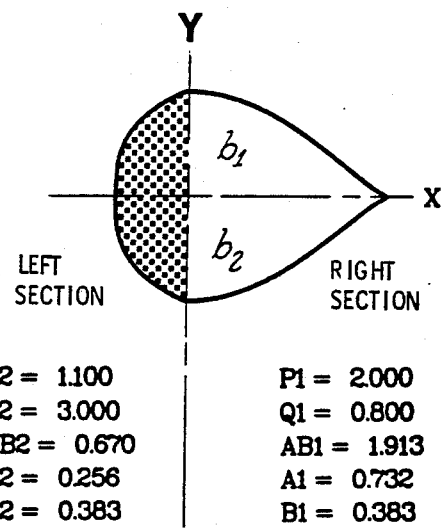
FIG. 3b is a cross section split figure formed by the invention with x-axis symmetry and the given characteristics.

For the case of x-axis symmetry, referring to FIG. 3b $$b_1 = b_2 \quad (4)$$

The enclosed area may be defined in terms of its fractional portions as $$(\text{Area}) = \frac{a_1 b_1 \phi(p_1, q_1)}{2 FA} \quad (5)$$

$$(\text{Area}) = \frac{a_2 b_2 \phi(p_2, q_2)}{2(1 - FA)} \quad (6)$$

where FA represents the fractional area of either the upper (x-summetry) or right (y-symmetry) side of the enclosed area and (1- FA) represents the fractional area of the other side of the enclosed area.

FIGS. 3a and 3b show cross section geometry symmetrical to the y-axis and the x-axis, respectively. Whenever either exponent p or q is less than 2.0, the cross-sectional curve will not intersect the x or y axis in the normal direction.

The third step of the method is used as an option to modify the cross-sectional configuration developed in step two where desired. In the case of a flow passage, such as an engine intake or exhaust port, the ideal configuration developed in step two for minimizing flow losses may be too wide to fit within the space allocated in the cylinder head for individual port spacing. In such a case, the coordinate transformation system discussed below may be applied to reconfigure the port shape into a narrower envelope without changing the cross-sectional flow area. Obviously, many other uses of coordinate transformation may also be made in accodance with the invention.

CONSTANT AREA COORDINATE TRANSFORMATION

The constant area coordinate transformation system consists of three major steps set forth below and illustrated in FIG. 4.

1. A wrapping center P ($R_x$, $R_y$) is arbitratily selected with respect to the original coordinate system (x and y) and an angle of rotation is computed from $$\psi = \tan^{-1}(R_y/R_x) \quad (7)$$

The distance of the wrapping circle center from the origin is from $$R_{xy} = \sqrt{R_x^2 + R_y^2} \quad (8)$$

The original coordinates (x, y) are then transformed to x', y' by rotation through the angle $\psi$.

$$x' = -x \cos\psi + y \sin\psi \quad (9)$$

$$y' = -x \sin\psi + y \cos\psi \quad (10)$$

2. A cross section is then generated by mapping the distance x' onto the circumference of a circle centered at P ($R_x$, $R_y$) and having the radius (y'+$R_{xy}$). The extended angle is given by:

$$\phi = \tan^{-1}\frac{x'}{(y' \pm R_{xy})} \quad (11)$$

and then
$$x'' = (y' \pm R_{xy})\sin\phi \quad (12)$$

$$y'' = (y' \pm R_{xy})\cos\phi \pm R_{xy} \quad (13)$$

The formulas (11), (12) and (13) are geometrically equivalent to wrapping the original coordinates around a circle with a center located at $R_x$, $R_y$) and with a radius of (y' ± $R_{xy}$)

3. The final step is to transform the (x", y") coordinates back to the original (x, y) system.

$$x_w = x''\cos\psi - y''\sin\psi \quad (14)$$

$$y_w = x''\sin\psi + y''\cos\psi \quad (15)$$

Figure 4:
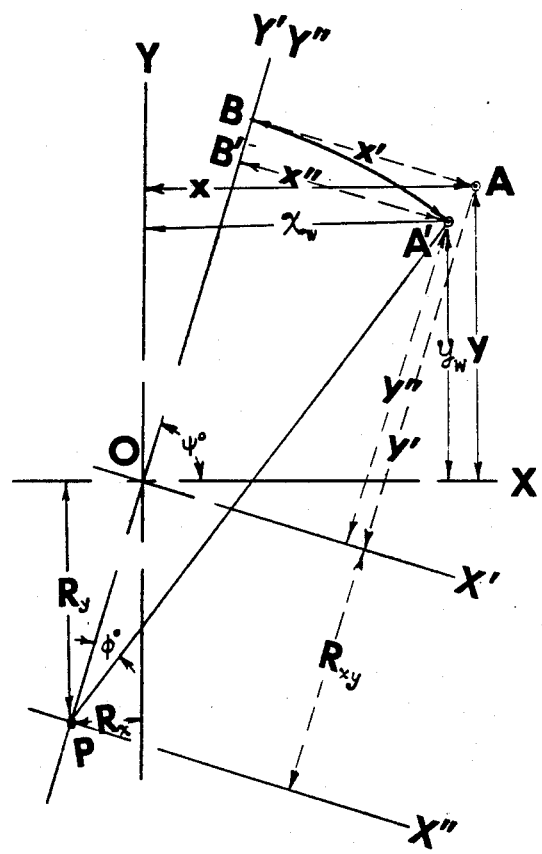
FIG. 4 is a graphical plot illustrating a coordinate transformation system.
Figure 5:
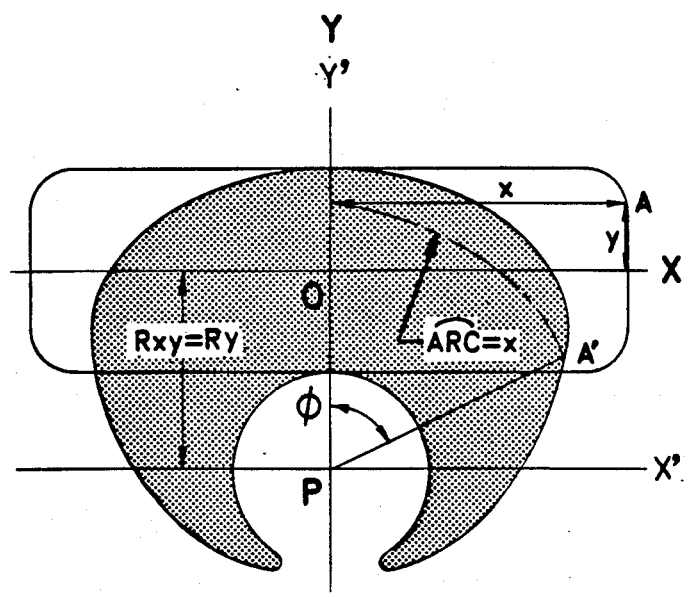
FIG. 5 is a cross section figure showing the change in configuration resulting from the use of the coordinate transformation system illustrated in FIG. 4.
Figure 6A:
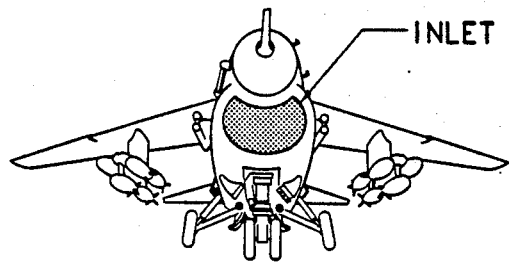
FIG. 6a is a front pictorial view of a jet aircraft showing the entrance to the inlet duct.
Figure 6B:
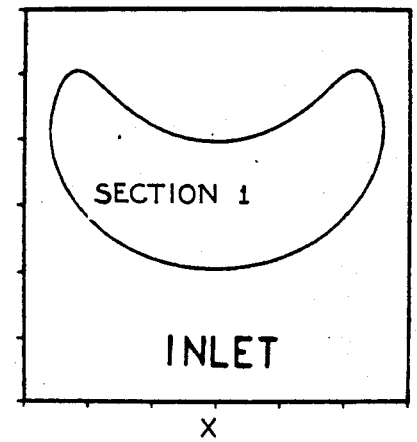
FIGS. 6b–6d are cross sections through the duct at selected locations along its length.
Figure 6C:
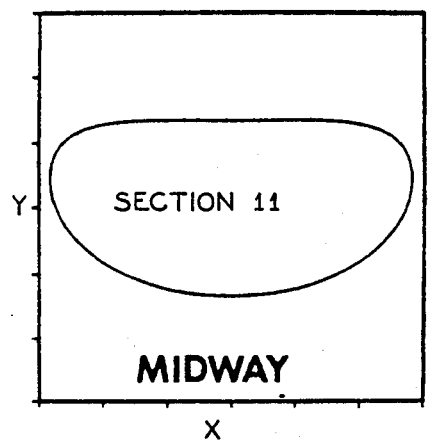
Figure 6D:
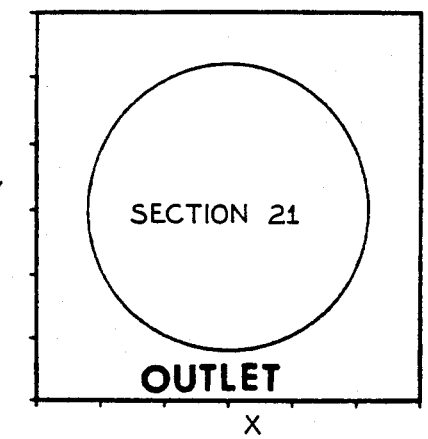
Figure 6E:
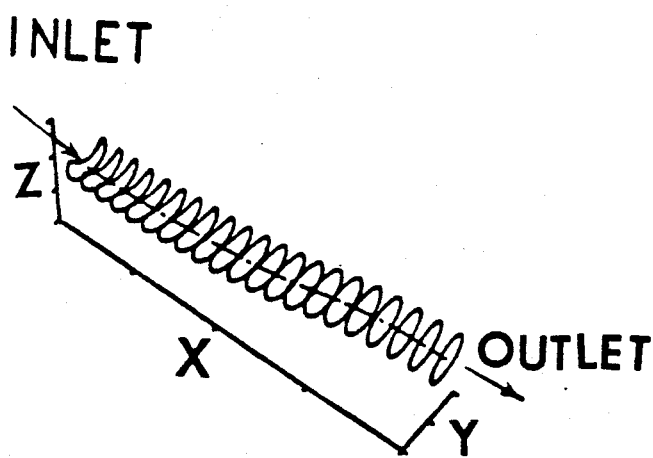
FIG. 6e is a graphic pictorial view showing a series of cross sections through the duct.
Figure 7A:
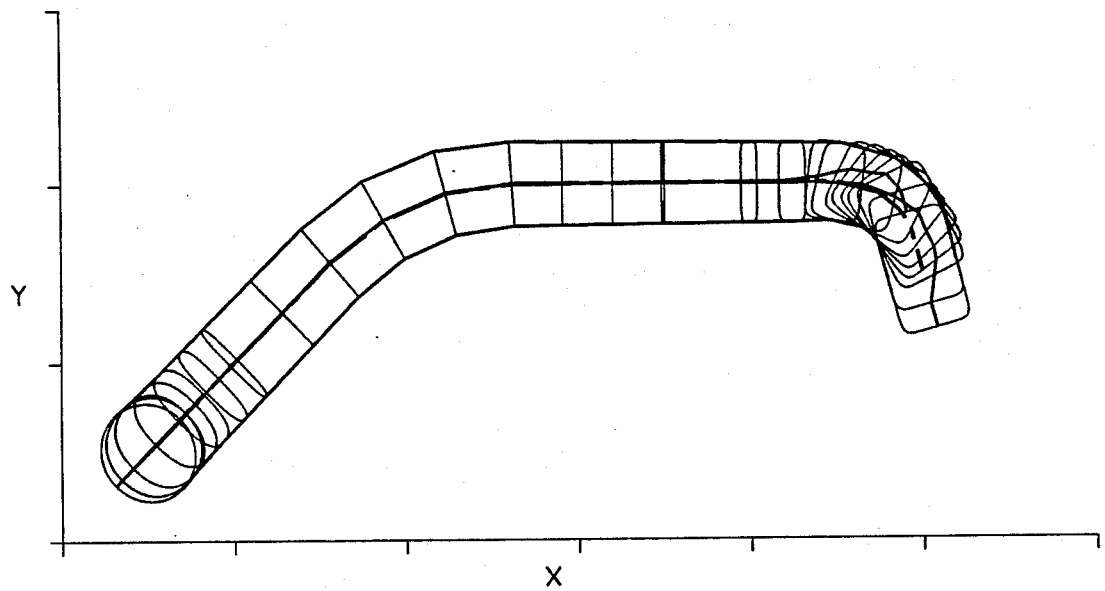
Figure 7B:
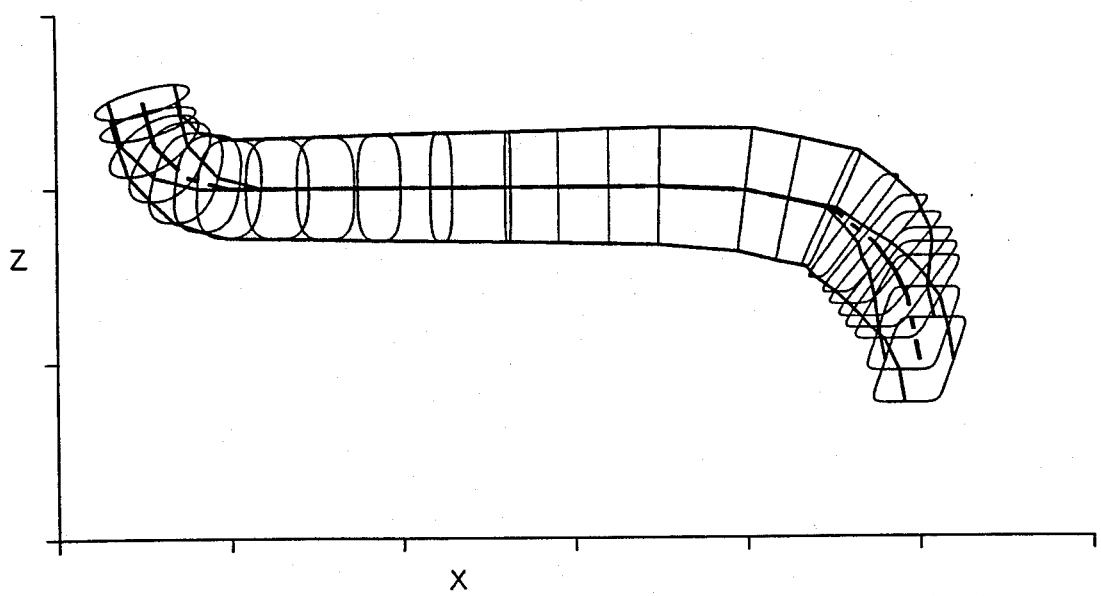
Figure 7C:
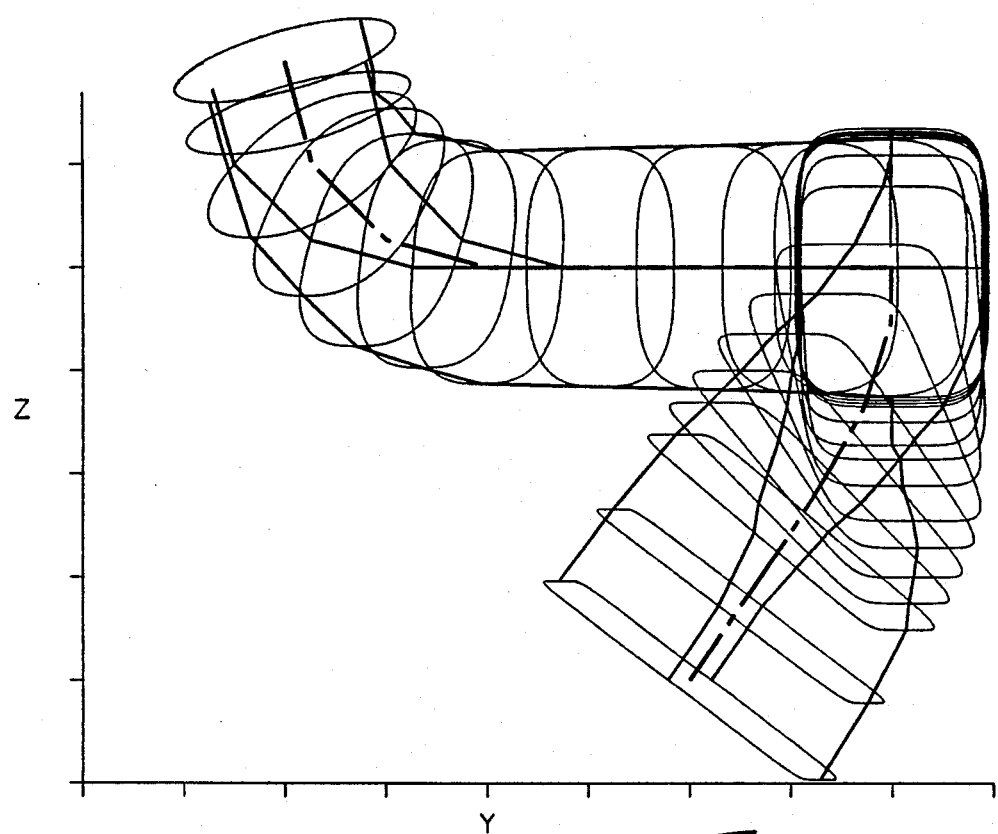
Figure 7D:
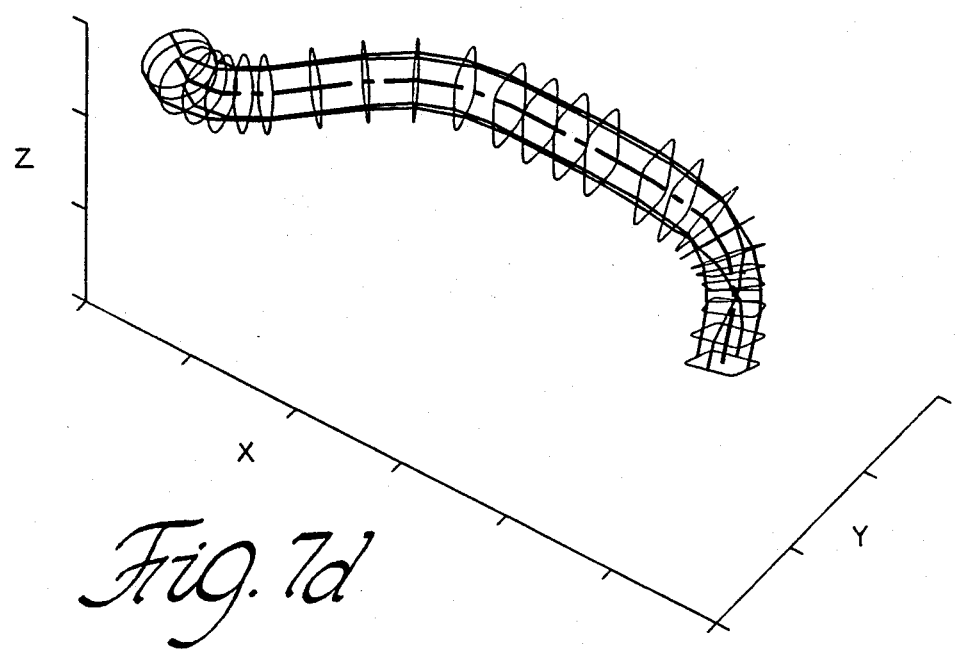
Figure 8A:
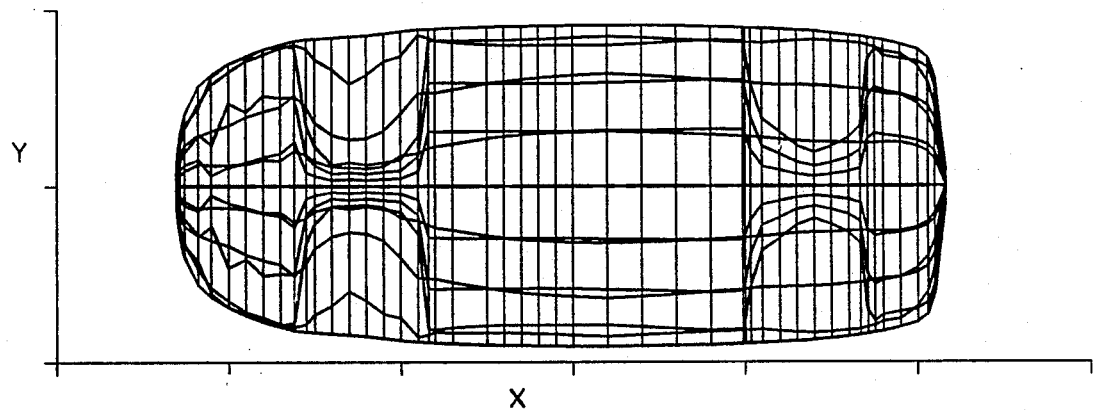
Figure 8B:
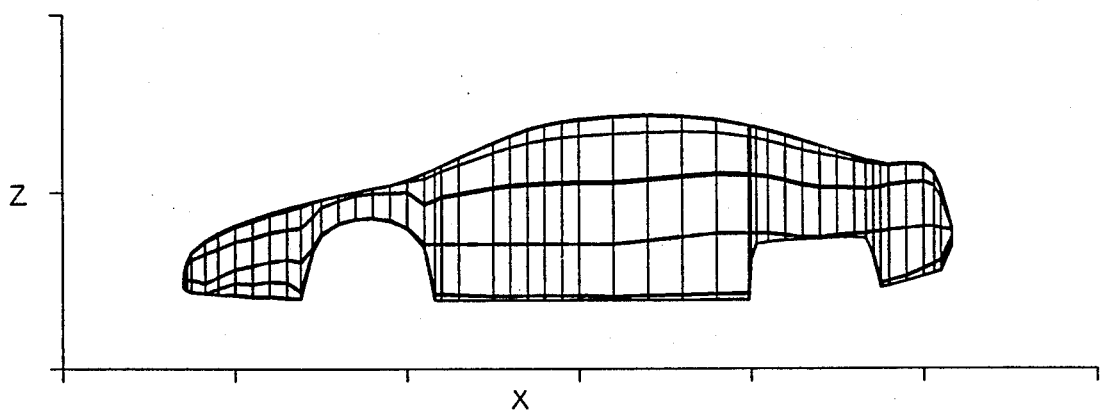
Figure 8C:
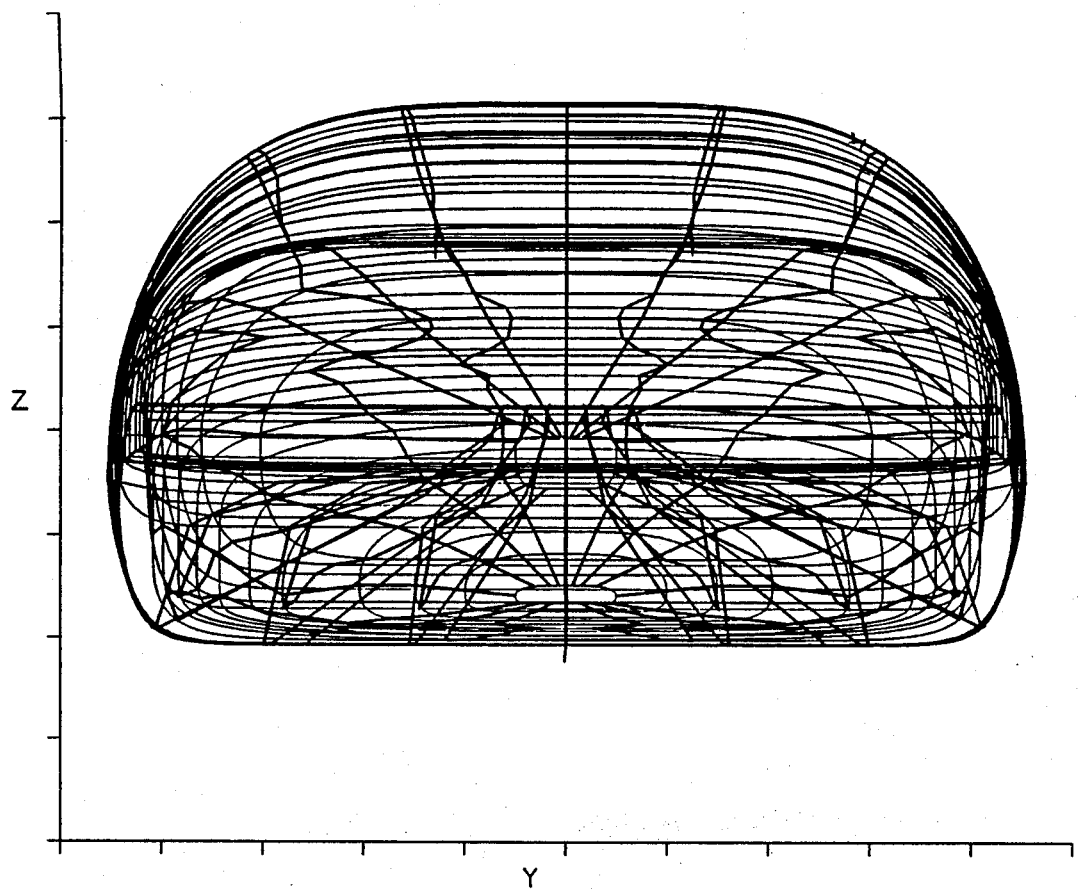
Figure 8D:
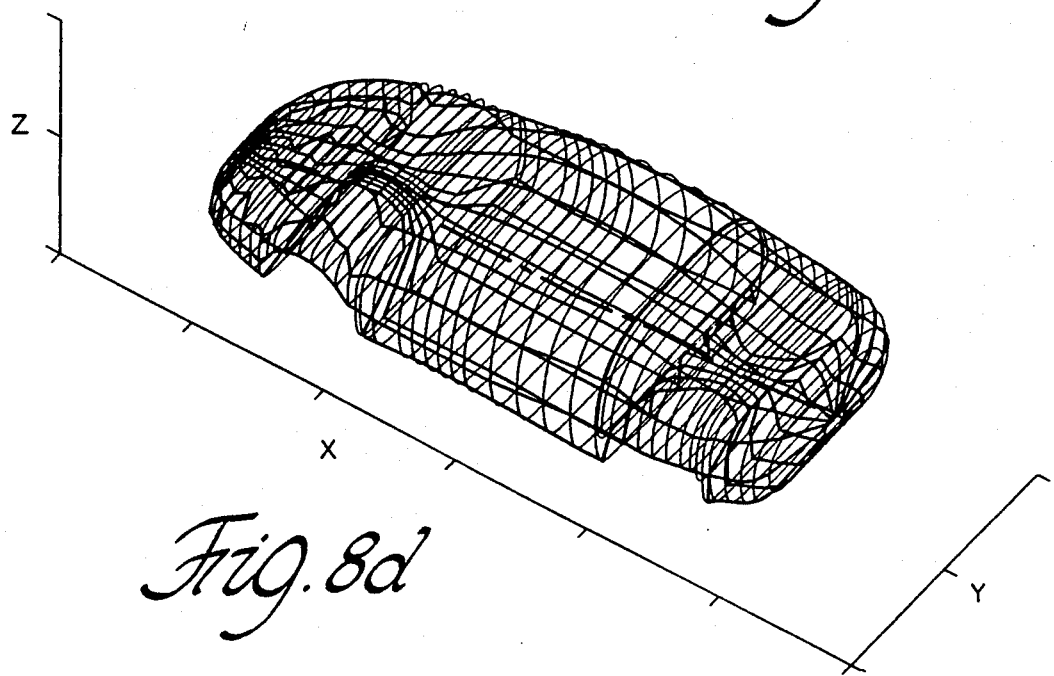
Figure 9A:
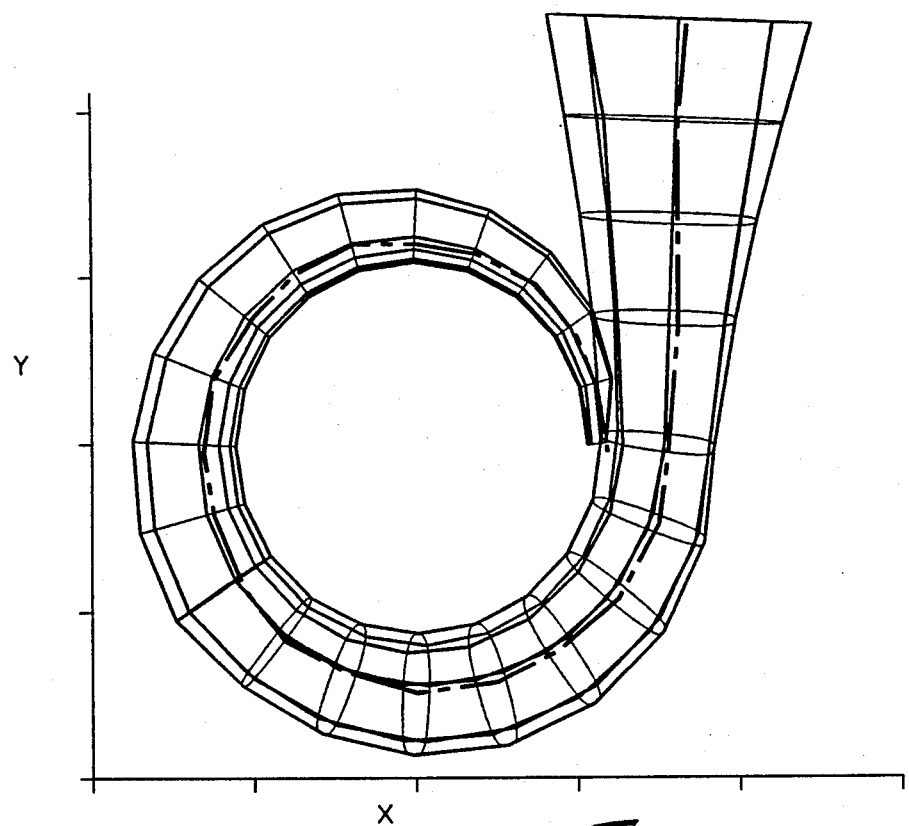
Figure 9B:
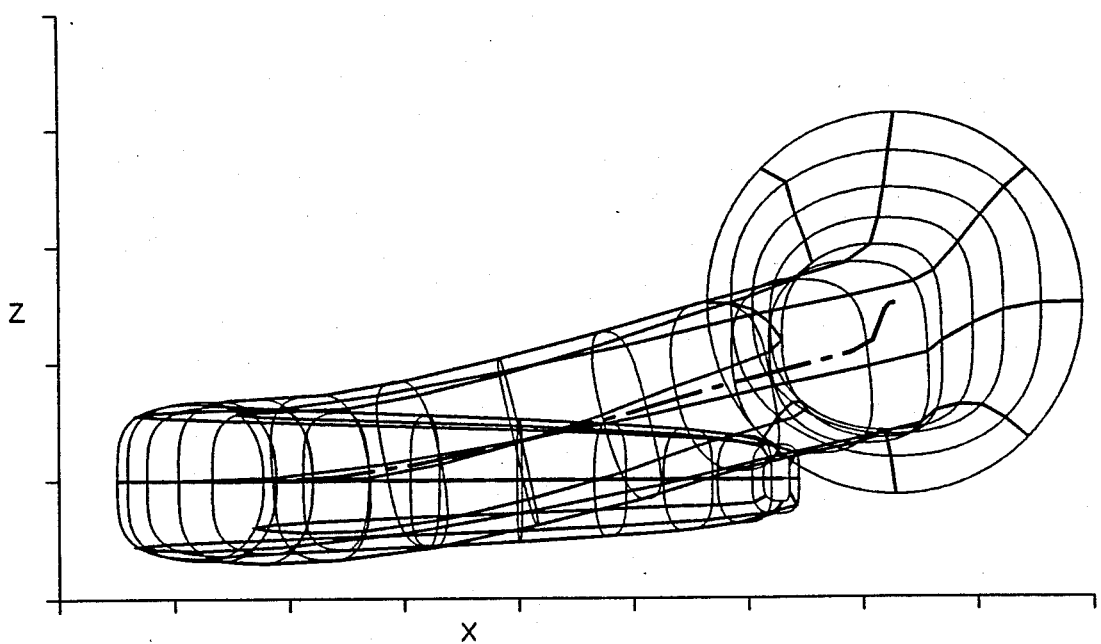
Figure 9C:
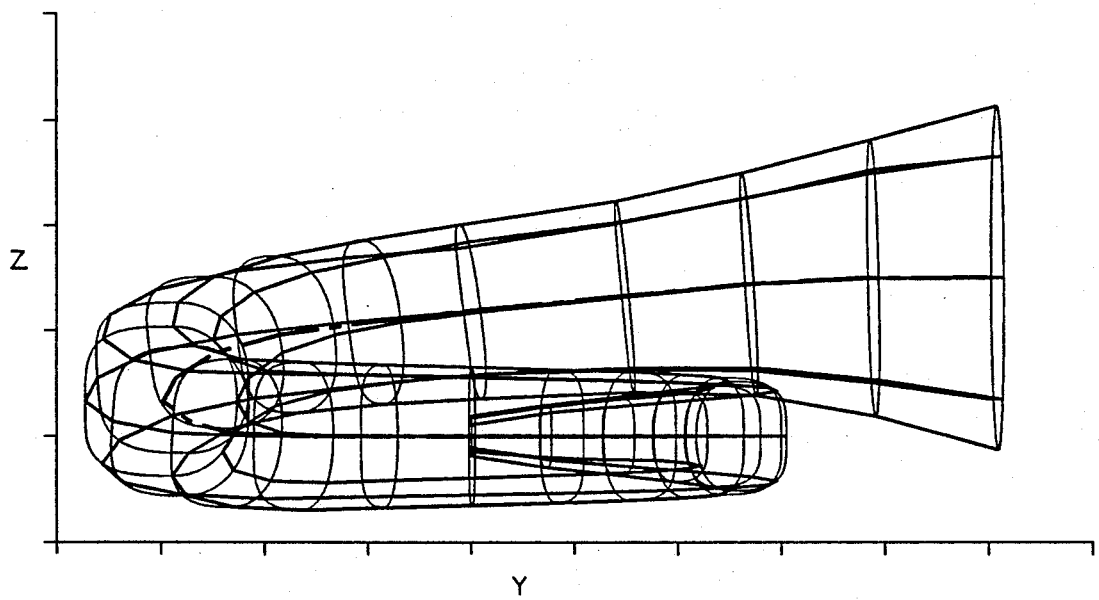
Figure 9D:
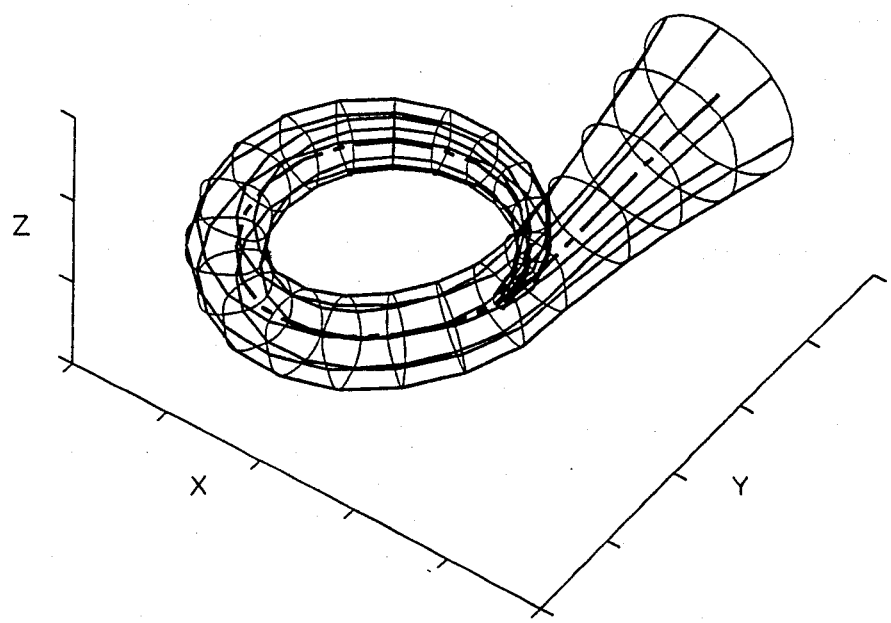

FIG. 4 shows the geometric representation of the transformations (Equations 7 through 15). FIG. 5 shows a complete cross-sectional transformation. The open area represents the original cross section. The shaded area represents the same geometric form after transformation with the wrapping center at $R_x$=0, $R_y$=−2, $R_{xy}$=2 and $\psi$=90°.

After having determined the shape of the exterior or interior surface of the flow body developed in the first three steps, it is necessary to actually form the body, using the dimensions and coordinates previously developed. Any suitable methods may be utilized in carrying out this step four.

In the case of a flow passage of any type, the coordinates established may be used to directly machine a passage in a body or to form a mold or core stick for use in molding or casting a body with the desired passage in place. A model of the passage or core can also be similarly formed. In the case of a body for a vehicle or other fluid passage member, the established coordinates may be applied to directly form the body or a die for forming it or a model thereof. A wire frame figure of the body or model can be readily constructed by joining points with the same index around consecutive cross sections and then joining points within each of the cross sections While the coordinates may be manually applied in step four, the method is particularly applicable to peformance in a computer to provide an output that may be directly applied in a numerically controlled machining process in accordance with current practice in the machine tool industry.

EXAMPLES

In order to better illustrate the application of the invention, there are given below a number of examples of products which could be obtained through the application of the steps of my invention.

In FIGS. 6a–e there are shown the inlet, selected cross sections and the sectioned configuration of a jet engine inlet duct for use in a jet aircraft. The inlet section must blend into the underside of the airframe, but the outlet to the engine must be round. The ducting is a diffuser because the ambient air enters at sonic or subsonic conditions, therefore the cross-sectional shapes and areas are crucial design parameters. After application of the cross section area design specifications to evolve a passage configuration in step two of my method, the coordinate transformation system of step three is applied to adjust the boundary configuration to fit within the airframe.

FIGS. 7a–d represent the wire frame configuration for a passage of an engine inlet or exhaust manifold. In developing system passages, parts intereferences, such as bolts and valves can be anticipated in the design process.

FIGS. 8a–d show the application of the method of my invention to the development of a streamlined vehicle body.

FIGS. 9a–d illustrate the development of a radial flow turbine scroll by the method of my invention. The gross area distribution is specified to satisfy the usual criteria of minimum static pressure drop and outlet flow angle deviation. FIG. 10 shows the complete core assembly for the turbine scroll of FIG. 9, the assembly being made up of sections formed by N/C machining from the coordinates developed by my method. FIG. 11 shows a turbine scroll casting made with a core assembly of the type shown in FIG. 10.

DESIGN EXAMPLE

The following is an example of the application of the design procedure or method of the present invention to the development of a simple flow path.

Referring now to FIGS. 12–18, suppose it is desired to provide a 90° elbow connecting a specified inlet at point 121 with a specified outlet at point 122. The centerline, mean line or axis of the flow path is a circular arc 123 in the x', y' plane intersecting the x' axis at x'=2, y'=0 and the y' axis at x'=0, y'=2. The inlet cross section 131 at point 121 is a square having a height and width of two units and slightly rounded corners 132 as illustrated in FIG. 13. The outlet cross section 141 at point 122 is a two unit diameter circle as shown in FIG. 14.

For the cross sections normal to the flow path at 121 and 122, the coordinates x, y are centered on the centerline 123; i.e., points x=0, y=0 are on the centerline of the flow path in the x, y planes. This same convention for x, y is used at all the cross sections along the flow path.

The area of the modified square inlet cross section 131 is 3.89 square units ($u^2$) and the area of the circular outlet cross section 131 is 3.14 square units ($u^2$). To match the inlet cross section 131, the modified super-elliptical equation (1) becomes $$|x/1|^7 + |y/1|^7 = 1$$

FIG. 15 shows a three dimensional perspective view of the prescribed centerline 123 and the inlet and outlet cross sections 131 and 141, respectively.

If it is decided to use a linear variation in the area from the inlet 131 to the outlet 141, the area of the cross section at the center of the bend, located at 45° in the x', y' plane, will be $$\frac{3.89 + 3.14}{2} = 3.515 \, u^2$$

If a modified shape is desired in the center (45°) cross section to reduce the radial pressure gradient, the desired shape can be specified. For this example, a cross section has been chosen with differing values of p and q in the outer and inner sections. FIG. 16 shows the resulting shape of the center cross section 161 where the outer portion 162 is assigned shape factors p=2.0 and q=1.5 and the inner portion 163 is assigned the differing factors p=2.3 and q=2.2. The cross-sectional area is arbitrarily split so that the outer portion 162 contains 42% of the total area and the inner portion 163 contains 58%.

For the outer portion, the area function $\phi(p_o, q_o)$ =2.957 from equation (2.1). Substituting the known and selected values in equation (5) gives $$\text{Area} = 3.515 = \frac{a_o b_o (2.957)}{2(0.42)}$$

For the inner portion, $\phi(p_i q_i)$ =3.275 from equation (2.1) and equation (6) becomes $$\text{Area} = 3.515 = \frac{a_i b_i (3.275)}{2(1 - 0.42)}$$

To match the boundaries at the plane of symmetry (x', y'), $b_o = b_i$. Thus, there are four unknowns and three equations. If a value $a_i = 1$ is specified, the equations can be solved to determine $$b_i = b_o = 1.245$$

$$a_o = 0.802$$

The portions of the flow path so far determined by the procedure are illustrated in FIG. 17.

For this example, linear interpolation has been used to define all the cross sections between 131 and 161 and between 161 and 141. However any other suitable form of interpolation could be used if desired. FIG. 18 shows the cross sections 131 at 0°, 161 at 45° and 141 at 90° as well as representative intermediate cross sections 181 at 15°, 182 at 30°, 183 at 60° and 184 at 75°. Additional cross sections 185 and 186 are also shown which are identical to and outward of the cross sections 131 and 141 to indicate connecting straight portions of the flow path. As many intermediate cross sections as desired may be specified by the interpolation process. Obviously, more cross sections result in a better definition of the flow path.

The following table shows the values specified by the procedure for the cross sections of the elbow illustrated in FIG. 18.

| Section | Angle | Area | FA | $p_o$ | $q_o$ | $p_i$ | $q_i$ |
|---------|-------|-------|-------|------|------|------|------|
| 131 | 0° | 3.890 | 0.500 | 7.00 | 7.00 | 7.00 | 7.00 |
| 181 | 15° | 3.765 | 0.473 | 5.33 | 5.17 | 5.43 | 5.40 |
| 182 | 30° | 3.640 | 0.447 | 3.67 | 3.33 | 3.87 | 3.80 |
| 161 | 45° | 3.515 | 0.420 | 2.00 | 1.50 | 2.30 | 2.20 |
| 183 | 60° | 3.390 | 0.447 | 2.00 | 1.67 | 2.20 | 2.13 |
| 184 | 75° | 3.265 | 0.473 | 2.00 | 1.83 | 2.10 | 2.07 |
| 141 | 90° | 3.140 | 0.500 | 2.00 | 2.00 | 2.00 | 2.00 |

To complete the three dimensional wire frame representation of the flow path, the perimeters of all the cross sections are divided into an equal number of segments. Flow lines 187, 188, 189, 190 are then drawn connecting the junctions of similar segments in each of the cross sections as is shown in FIG. 18.

It should be recognized that my invention constitutes a significant advance beyond the ideas disclosed in my previously mentioned U.S. Pat. No. 3,860,360. The passage configurations of that patent are all based upon a super-elliptical equation in which exponents of equal value only are contemplated. The present invention, on the other hand, extends the flow path design capability into the much broader realm of passage and body configurations defined by a modified super-elliptical equation in which exponents of differing value are utilized. Further, non-symmetric geometry may be used in differing halves or quarters of the cross sections. Also, the shapes may be further modified by use of the optional coodinate transformation system. Thus the present invention adds to the known use of the equal exponent equation, the greatly enlarged design capability available from the use of exponents of differing values and the described additional optional features.

Recognizing that my prior disclosure of the use of the equal exponent equation is available in the known prior art for what it teaches and makes obvious, the appended claims of the present invention have been specifically directed to those aspects of components and methods for their manufacture which depend upon the use of the modified super-elliptical equation disclosed herein under conditions in which the exponents p and q applied therein differ in value from one another during at least some portion of the configuration. This subject matter, it should be apparent, constitutes a significant advance over the prior art.

While the invention has been described by reference to certain embodiments chosen for purposes of illustration, it should be understood that numerous changes could be made without departing from the spirit and scope of the inventive concepts disclosed. Accordingly, it is intended that the invention not be limited to the disclosed embodiments, but that it be given the full scope permitted by the language of the following claims.

The embodiments of the invention in which an exclusive property or privilege is claimed are defined as follows:

I claim:

1. A body including two spaced locations and a flow path for conducting fluids between said spaced locations with a high degree of flow efficiency, said flow path being defined by
    an axis connecting said locations of the body and
    a boundary surface of said body intermediate said locations and defined by coordinates from said axis, said boundary surface defining
    a first cross-sectional area normal to the axis at a first one of said locations,
    a second cross-sectional area normal to the axis at a second one of said locations and
    intermediate cross-sectional areas normal to the axis between said locations,
    wherein the coordinates of the boundaries of at least some of said cross-sectional areas follow the relation that the absolute value of the quantity x/a raised to the power p plus the absolute value of the quantity y/b raised to the power q equals unity, where x and y are the coordinates of the boundaries of the cross sections, a is half the width of each cross section, b is half the height of each cross section and the exponents p and q are shape factors which are of unequal value for at least half of said cross-sections and variations in which are without abrupt changes between said locations.

2. A component of an engine or the like,
    said component internally defining a chamber and including
    an outside wall spaced from the chamber, and
    a flow port for conducting fluids between said outside wall of the component and the chamber with a high degree of flow efficiency, said flow port being defined by
    an axis extending between said all and said chamber and
    a boundary surface of said component between said wall and said chamber and defined by coordinates from said axis, said boundary surface defining
    a first cross-sectional area normal to the axis at said wall,
    a second cross-sectional area normal to the axis at said chamber and
    intermediate cross-sectional areas normal to the axis in the portions of the flow port between said wall and chamber,
    wherein the coordinates of the boundaries of at least some of said cross-sectional areas follow the relation that the absolute value of the quantity x/a raised to the power p plus the absolute value of the quantity y/b raised to the power q equals unity, where x and y are the coordinates of the boundaries of the cross sections of the flow path, a is half the width of the flow path at each cross section, b is half the height of the flow path at each cross section and the exponents p and q are shape factors which are of unequal value for at least half of said cross sections and variations in which are without abrupt changes between said locations.

3. A body including two spaced locations and a boundary surface of defining a flow path for directing fluids between said spaced locations with a high degree of flow efficiency,
    said boundary surface being at least partially defined by coordinates following the relation that the absolute value of the quantity x/a raised to the power p plus the absolute value of the quantity y/b raised to the power q equals unity,
    where x and y are the coordinates of the boundary surface at a cross section thereof,
    a is half the width of the boundary surface at the cross section,
    b is half the height of the boundary surface at the cross section and
    the exponents p and q are shape factors of unequal value, variations in which are without abrupt changes between said locations.

4. A body including two spaced locations and a boundary surface defining a flow path for directing fluids between said spaced locations with a high degree of flow efficiency,
    said boundary surface having an axis and being at least partially defined by coordinates following the relation that the absolute value of the quantity x/a raised to the power p plus the absolute value of the quantity y/b raised to the power q equals unity,
    where x and y are the coordinates of the boundary surface at a cross section thereof normal to the axis,
    a is half the width of the boundary surface at the cross section,
    b is half the height of the boundary surface at the cross section and
    the exponents p and q are shape factors of unequal value, variations in which are without abrupt changes between said locations.

5. A method of making a flow path defining means for directing the flow of fluids with a high degree of flow efficiency, said method comprising the steps of:
    selecting an axis for said flow path defining means smoothly connecting spaced locations,
    establising a boundary defined by coordinates from said axis, said boundary defining a first selected cross-sectional area normal to the axis at a first one of said locations, a second selected cross-sectional area normal to the axis at a second one of said locations and intermediate cross-sectional areas normal to the axis in the portions of the flow path defining means between said locations, the coordinates of the boundaries of at least some of said cross-sectional areas following the relation that the absolute value of the quantity x/a raised to the power p plus the absolute value of the quantity y/b raised to the power q equals unity, where x and y are the coordinates of the boundaries of the cross sections of the flow path, a is half the width of the flow path at each cross section, b is half the height of the flow path at each cross section and the exponents p and q are shape factors which are of unequal value for at least half of said cross sections and variations in which are without abrupt changes between said locations, and
    forming a body having a surface conforming with said established boundary between said spaced locations.

6. A method according to claim 5 and comprising the further step of:
    reshaping the boundary of at least a portion of the flow path by application of a consistant coordination transformation method which alters the shape of the cross sections without changing their cross-sectional areas, said reshaping step being performed prior to the step of forming said body.

7. A method as in claim 5 wherein said surface is an outer surface of the body.

8. A method as in claim 7 wherein said body comprises said flow path defining means for directing fluid flow past said body between said spaced locations.

9. A method as in claim 7 and further comprising using said body as a model of an internal flow path from which a housing is formed with a internal surface conforming with said established boundary, said housing comprising said flow path defining means which forms an internal flow path for fluid flow between spaced locations of the housing.

10. A method as in claim 5 wherein said surface is an inner surface of the body.

11. A method as in claim 10 wherein said body comprises said flow path defining means for directing fluid flow within said body between said spaced locations.

12. A method as in claim 10 and further comprising using said body as a model of an internal flow path from which a housing is formed with an internal surface conforming with said established boundary, said housing comprising said flow path defining means which forms an internal flow path for fluid flow between spaced locations of the housing.

* * * * *